Dec. 22, 1942.  J. KUNA  2,305,623
SLIDING CLASP FASTENER
Original Filed June 29, 1940   4 Sheets-Sheet 1
Fig. 1.
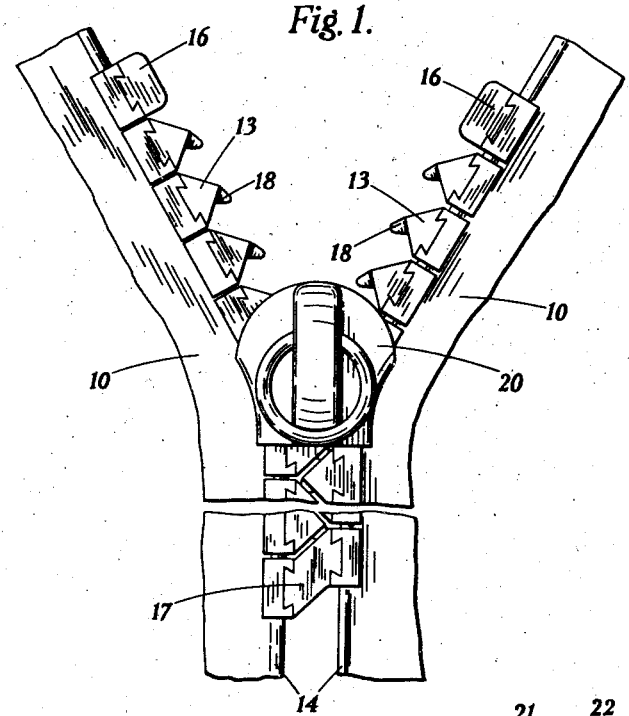
Fig. 2.
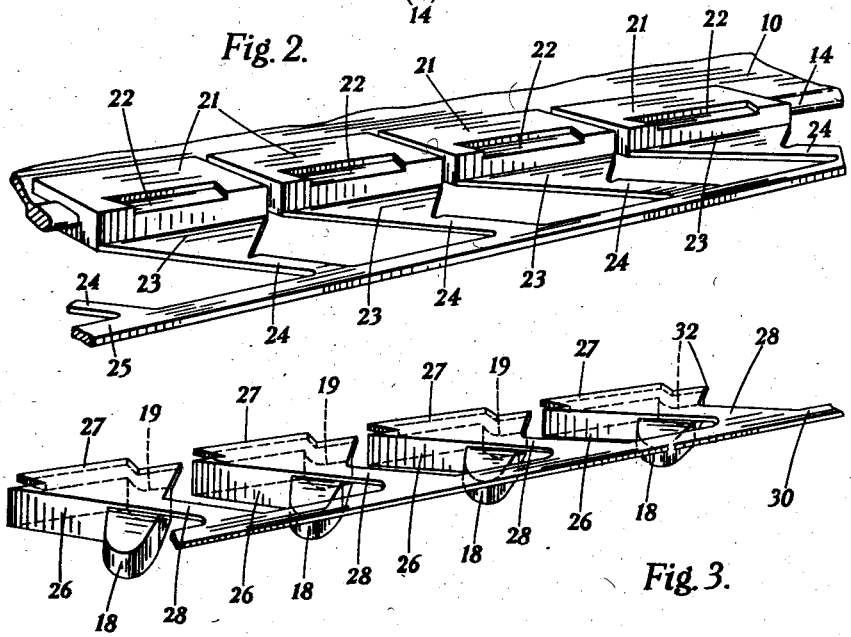
Fig. 3.
INVENTOR
Josef Kuna
BY
ATTORNEY Dec. 22, 1942.  J. KUNA  2,305,623
SLIDING CLASP FASTENER
Original Filed June 29, 1940    4 Sheets-Sheet 2
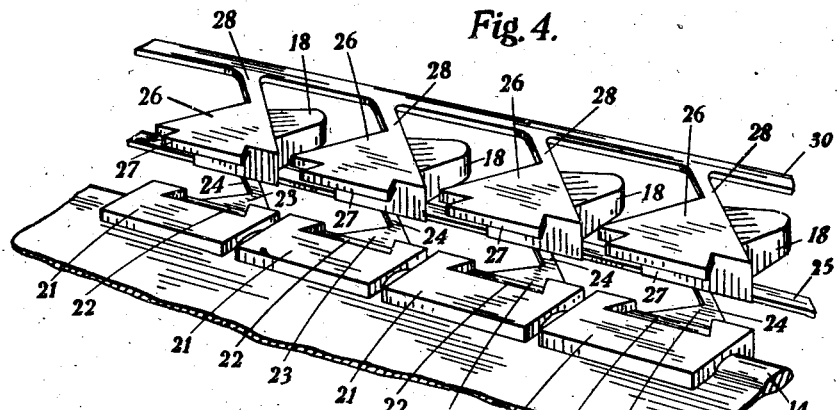
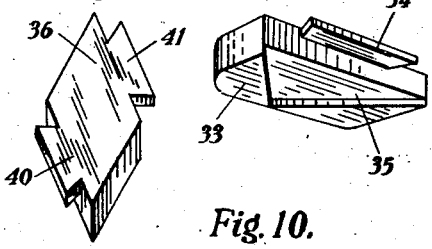
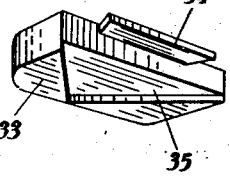
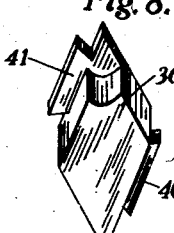
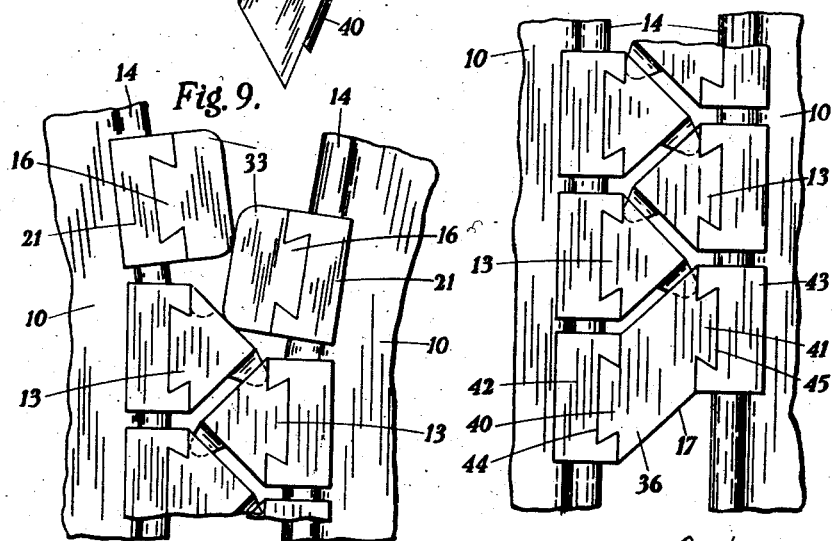

Dec. 22, 1942.   J. KUNA   2,305,623
SLIDING CLASP FASTENER
Original Filed June 29, 1940   4 Sheets-Sheet 3

INVENTOR
Josef Kuna
ATTORNEY

Dec. 22, 1942.    J. KUNA    2,305,623
SLIDING CLASP FASTENER
Original Filed June 29, 1940    4 Sheets-Sheet 4
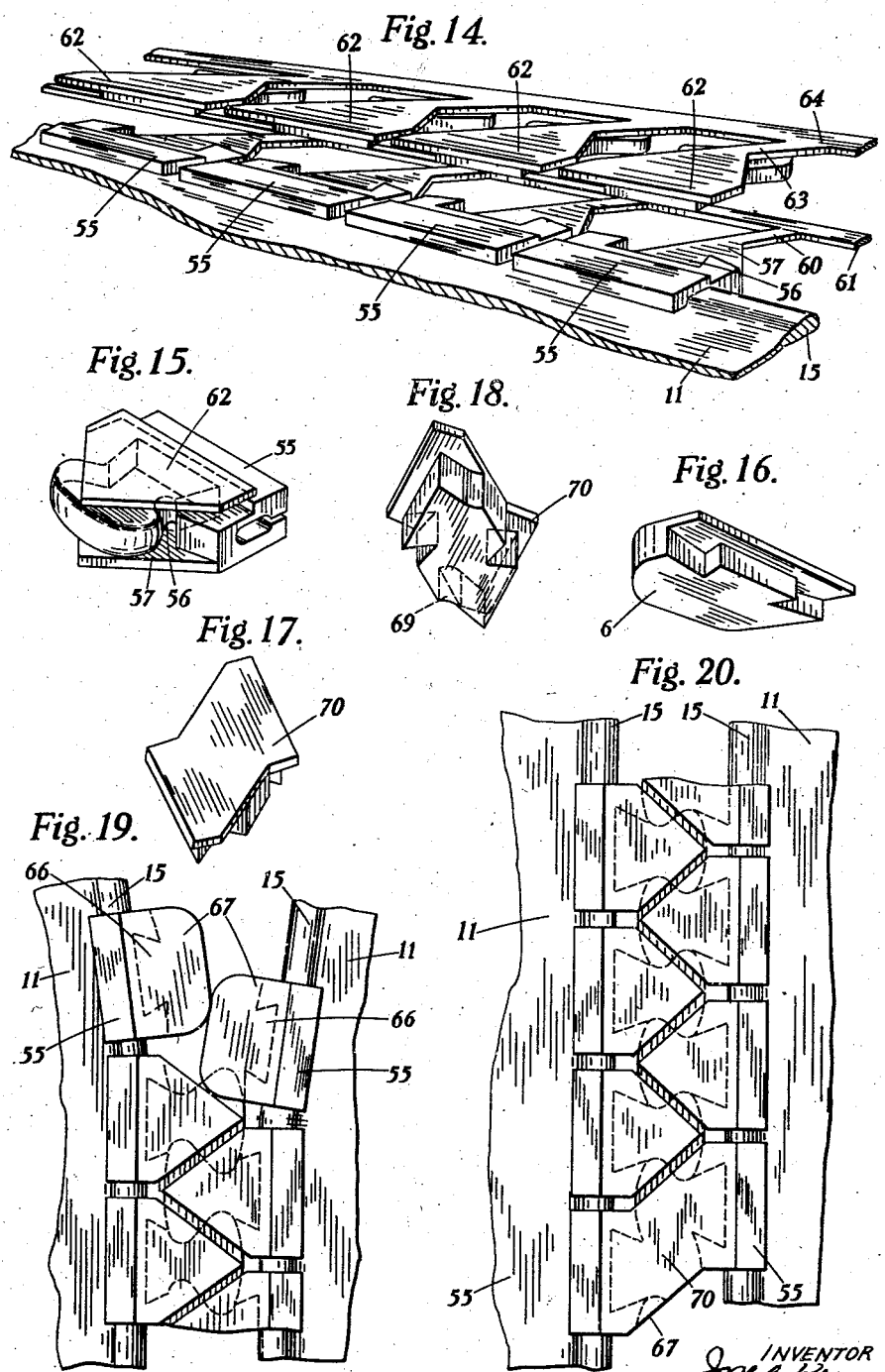

Patented Dec. 22, 1942

2,305,623

UNITED STATES PATENT OFFICE 2,305,623

SLIDING CLASP FASTENER

Josef Kuna, Oxford, England, assignor of one-half to Brevetia Limited, London, England, a British company Original application June 29, 1940, Serial No. 343,060. Divided and this application July 22, 1941, Serial No. 403,471. In Great Britain January 22, 1940

6 Claims. (Cl. 24—205)

This patent application is divided out of my co-pending patent application Serial No. 343,060, filed June 29, 1940.

The present invention relates to sliding clasp fasteners, the fastening members and preferably also the stop members of which are made of non-metallic material such as Celluloid or other cellulosic material, Bakelite, and analogous materials, now commonly embraced in the term "plastics."

An object of this invention is to provide an improved sliding clasp fastener of the kind referred to which is easy to be manufactured.

Another object is to provide improved non-metallic stop members for such sliding clasp fasteners.

Figure 11:
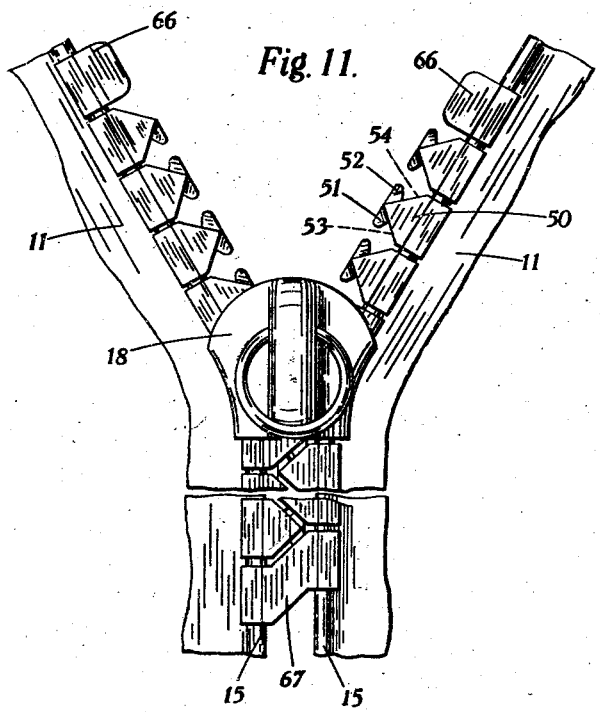
Figure 12:
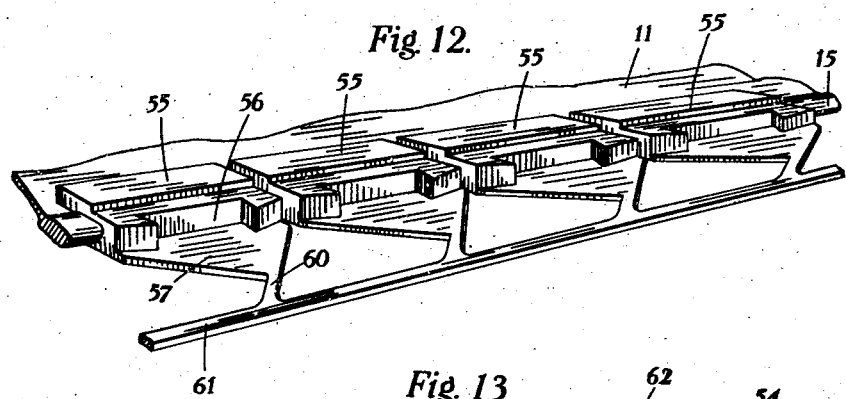
Figure 13:
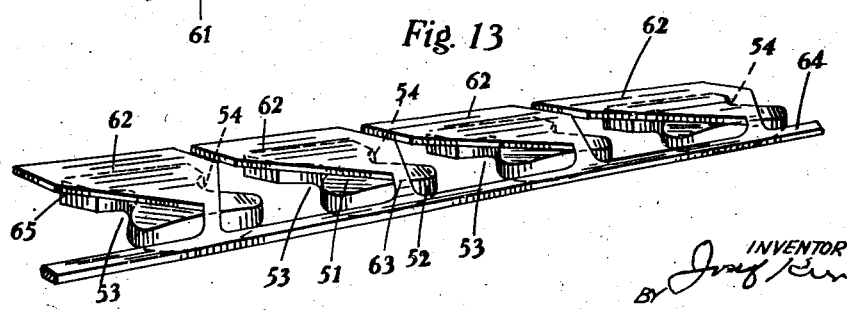

Other objects and advantages of the invention will become apparent from the sub-joined detailed description taken in conjunction with the accompanying drawings in which Fig. 1 is a view of one form of a complete sliding clasp fastener embodying the invention, Figs. 2, 3 and 4 are perspective views illustrating steps in the manufacture of the fastener of Fig. 1, Fig. 5 is a view in greater detail of one of the fastening members of the fastener of Fig. 1, Fig. 6 is a perspective view of part of a stop member at the open, upper, end of the sliding clasp fastener of Fig. 1, Figs. 7 and 8 are perspective views showing both sides of part of the stop member at the closed, lower end of the fastener of Fig. 1, Figs. 9 and 10 are more detailed views respectively of the upper and lower end of the fastener of Fig. 1 in closed position, Figure 11 is a view of another form of a complete sliding clasp fastener embodying the invention, Figures 12, 13 and 14 are perspective views illustrating steps in the manufacture of the fastener of Figure 11, Figure 15 is a view in greater detail of one of the fastening members of the fastener of Figure 11, Figure 16 is a perspective view of a part of a stop member at the open, upper end of the sliding clasp fastener of Figure 11, Figures 17 and 18 are perspective views showing both sides of part of the stop member at the closed, lower end of the fastener of Figure 11, Figures 19 and 20 are more detailed views respectively of the upper and lower end of the fastener of Figure 11 in closed position.

Referring first to Figs. 1 to 10, the sliding clasp fastener illustrated comprises a pair of similar tapes 10 or other flexible supports each having attached to it a series of fastening members denoted generally by 13 spaced longitudinally along the edge 14 of the tape, which edge is shown as being beaded or thickened. A pair of stop members denoted generally by 16 are provided at the open, upper, end of the fastener, one attached to each tape 10, and a single stop member 17 is attached to both tapes at the closed, lower, end of the fastener. The members 13 are provided with coupling projections 18 and corresponding recesses 19 (shown more clearly in Fig. 5), the projection 18 of a member 13 on one tape being adapted to be brought into and out of interlocking engagement with a recess 19 of an adjacent member 13 on the other tape by means of a slider 20 of conventional construction to close and open the fastener in known manner. The fastening members 13 and the stop members 16 and 17 are made of non-metallic material such as Celluloid or other cellulosic material (e. g. cellulose acetate), Bakelite or analogous plastic material.

Difficulties have been experienced hitherto in attaching to the tape of a sliding clasp fastener members made of non-metallic material of the character just mentioned. Securing such members by glue or other adhesive necessitates extreme care to avoid the tapes becoming soiled during the gluing process. Resort to casting, moulding, or press-forming the members on the tapes in situ has the defect that the choice of shape for the coupling projections and recesses is restricted owing to the fact that the recesses have to correspond in shape to the projections and have to be so shaped that the mould or the like used for forming the members can be easily removed notwithstanding the fact that the members are closely spaced on the tape.

According to the present invention, each member consists of complementary parts, generally two, one part being cast, moulded, or press-formed in situ on the tape, while the other part is formed independently and subsequently joined to the first part, for example by means of an adhesive, the coupling projections and recesses being provided substantially on the second part.

Fig. 2 illustrates the tape 10 on to which are cast in situ parts 21. Each part 21 surrounds the beaded edge 14 of the tape 10 and has a recess 22 and a lug 23. In order to enable a plurality of parts 21 to be formed simultaneously around the edge of the tape 10 at the correct distance from each other, each lug 23 has an extension 24 connected to a rod-like member 25 ascertaining the distance between the parts 21 and enabling all the parts 21 to be formed by means of a common mould. It will be seen that the parts 21 are not provided with coupling members.

Fig. 3 shows a plurality of parts 26 having lugs 27 adapted to fit into the recesses 22 of the parts 21. The parts 26 are connected together to form a strip of parts by means of extension 28 connected to a rod-like member 30 which ascertains the correct distance between the parts 26. Each part 26 has a coupling projection 18 and a corresponding recess 19. The recesses 22 and the corresponding lugs 27 are dove-tailed.

As illustrated in Figs. 4 and 5, the parts 26 are joined to the parts 21 by inserting the lugs 27 into the recesses 22. The parts 26 are held in position by the lugs 23 which also close on one side the recesses 19 (see Fig. 5). The parts 26 are adhesively secured to the parts 21 by any suitable means such as acetone. After the parts 26 have been joined to the parts 21 the lugs 24 together with the rod 25 and the lugs 28 together with the rods 30 are cut off.

The stop members 16 consist also of two parts, one part being a part 21, the other part 33 having the shape illustrated in Fig. 6. It possesses a lug 34 adapted to fit into the recess 22 of the part 21 and a recess 35 accommodating the lug 23 of the part 21. It will be appreciated that in the manufacture of a stringer, the part 21 for the stop member 16 may be formed simultaneously with the parts 21 for the fastening members proper, and the part 33 of the stop member may be formed simultaneously with the parts 27 of the fastening members. The part 33 is joined and adhesively secured to its corresponding part 21.

Fig. 9 shows the upper part of the fastener in its closed position, the slider being omitted.

The stop member 17 at the closed end of the fastener is made by joining a bridge-like member 36 (see Figs. 7, 8 and 10) to parts 42 and 43 which are in shape identical with the parts 21. Each member 36 has lugs 40 and 41 adapted to fit into recesses 44 and 45 of the parts 42 and 43. The bridge member 36 is joined and and adhesively secured to the parts 42 and 43.

Figs. 11 to 20 illustrate a second embodiment of the sliding clasp fastener according to this invention. Whereas each fastening member of the sliding clasp fastener according to Figs. 1-10 has one coupling recess and a corresponding coupling projection, each fastening member 50 of the sliding clasp fastener according to Figs. 11 to 20 has two coupling recesses 53 and 54 and corresponding coupling projections 51 and 52 extending into opposite directions.

In the manufacture of this sliding clasp fastener, parts 55 are formed in situ on the tape 11 around its beaded edge 15 (see Fig. 12), each part 55 having a stepped recess 56 and lug 57 provided with an extension 60 joined to a connecting rod 61. Again, the parts 55 do not possess any coupling projections and recesses.

Fig. 13 shows a strip of parts 62 each having two projections 51 and 52 and two recesses 53 and 54. Extensions 63 connect each part 62 to a rod 64. Each part 62 is stepped as indicated at 65 so as to fit into the recess 56 of a part 55. As will be more clearly appreciated from Figs. 14 and 15, the parts 62 are joined to the parts 55 and adhesively secured thereto by any suitable means, the lugs 57 closing at one side the recesses 53 and 54 of the parts 62. Subsequently the lugs 60 and 63, together with the rods 61 and 64 are cut off.

Again, the stop member 66 at the open end of the fastener is formed of two parts 55 and 67 (see Figs. 16 and 19).

The stop member 67 at the closed end of the fastener comprises three parts, two parts being parts 55, connected together by a bridge member 70 (see Figs. 17, 18 and 20).

While I have shown and described in this specification two embodiments which my invention may assume in practice, it should be clearly understood that this description is only for the purpose of illustration and that other forms may occur to those skilled in the art.

What I claim is:

1. An interlocking member for sliding-clasp fasteners comprising two non-metallic complementary parts adhesively secured together one of said parts having a lug and a recess, and the other part having a coupling recess and a coupling projection and a lug engaging said recess of said one part.

2. An interlocking member as defined in claim 1 wherein said other part comprises one coupling projection only and a coupling recess open at one side of said other part, said lug on said one part closing the open side of said coupling recess.

3. In a sliding clasp fastener, an interlocking member comprising two complementary parts made of plastic material and adhesively secured together, one of said parts having a lug, a recess and means for embracing an edge of a flexible support for securing the members thereto, and the other part having a coupling recess, a coupling projection and a lug engaging said recess of said one part.

4. In a sliding clasp fastener, an interlocking member comprising two complementary parts made of plastic material, means for securing the member to an edge of a flexible support on one of said parts and an interlocking recess and projection on the other of said parts, said parts being provided with complementary means keying said parts together.

5. In a sliding clasp fastener, an interlocking member as defined in claim 4 and wherein a lug is provided on said first part for forming a side wall on the interlocking recess of the other part to partially close the same.

6. In a sliding clasp fastener the interlocking members of which are made of plastic material and are attached to adjacent edges of two flexible supports, a stop member for the closed end of the fastener comprising two parts each attached to one of said adjacent edges, a bridge-like member, and complementary means on said parts and said member fixing the correct relative position of said parts and said member, said member being adhesively secured to said parts.

JOSEF KUNA.